(12) United States Patent
Ben Eliezer et al.

(10) Patent No.: US 11,790,302 B2
(45) Date of Patent: Oct. 17, 2023

(54) SYSTEM AND METHOD FOR CALCULATING A SCORE FOR A CHAIN OF INTERACTIONS IN A CALL CENTER

(71) Applicant: NICE LTD., Ra'anana (IL)

(72) Inventors: Lior Ben Eliezer, Beer Yaakov (IL); Hila Kneller, Zufim (IL); Gennadi Lembersky, Haifa (IL)

(73) Assignee: NICE LTD., Ra'anana (IL)

( * ) Notice: Subject to any disclaimer, the term of this patent is extended or adjusted under 35 U.S.C. 154(b) by 188 days.

(21) Appl. No.: 16/715,136

(22) Filed: Dec. 16, 2019

(65) Prior Publication Data

US 2021/0182761 A1    Jun. 17, 2021

(51) Int. Cl.
*G06Q 10/0639* (2023.01)
*G06N 20/00* (2019.01)
*G06N 5/04* (2023.01)

(52) U.S. Cl.
CPC ......... *G06Q 10/06393* (2013.01); *G06N 5/04* (2013.01); *G06N 20/00* (2019.01)

(58) Field of Classification Search
CPC .... G06Q 10/06393; G06N 5/04; G06N 20/00; G06N 3/045; G06N 3/08
USPC ......................................................... 705/304
See application file for complete search history.

(56) References Cited

U.S. PATENT DOCUMENTS

| | | | | |
|---|---|---|---|---|
| 8,527,310 B1 * | 9/2013 | Capetz | .................. | G06Q 30/01 |
| | | | | 705/7.11 |
| 10,402,723 B1 * | 9/2019 | Silberman | ................ | G06N 3/08 |
| 2009/0222313 A1 * | 9/2009 | Kannan | .............. | G06Q 30/0202 |
| | | | | 705/7.31 |
| 2010/0191658 A1 * | 7/2010 | Kannan | ................ | G06Q 30/016 |
| | | | | 704/235 |
| 2010/0332287 A1 * | 12/2010 | Gates | ................. | G06Q 30/0203 |
| | | | | 705/7.32 |

(Continued)

OTHER PUBLICATIONS

Jonathan Oheix, Detecting bad customer reviews with NLP, https://towardsdatascience.com/detecting-bad-customer-reviews-with-nlp-d8b36134dc7e, Dec. 18, 2018 (Year: 2018).*

(Continued)

*Primary Examiner* — Sarah M Monfeldt
*Assistant Examiner* — John S. Wasaff
(74) *Attorney, Agent, or Firm* — PEARL COHEN ZEDEK LATZER BARATZ LLP

(57) ABSTRACT

Calculating a score for a chain of interactions in a call center may include: during a first training phase, train a first model which, given an interaction and interaction metadata, predict an initial estimated customer satisfaction score; during a second training phase, train a second model which, given an interaction and interaction metadata, text and metadata of an immediately preceding interaction in a chain of interactions, and features of the chain, predict a refined estimated customer satisfaction score; and during an inference phase: given a chain of interactions and metadata of each interaction, compute an initial estimated customer satisfaction score for each interaction using the first model; beginning with a second interaction in the chain and metadata of each interaction, compute a refined estimated customer satisfaction score for each interaction using the second model; combine the interaction scores into a combined customer satisfaction score; and output the score.

20 Claims, 8 Drawing Sheets

(56) References Cited

U.S. PATENT DOCUMENTS

| | | | | |
|---|---|---|---|---|
| 2012/0053990 | A1* | 3/2012 | Pereg | G06Q 40/08 705/7.31 |
| 2012/0130771 | A1* | 5/2012 | Kannan | G06Q 10/06393 705/7.32 |
| 2012/0296682 | A1* | 11/2012 | Kumar | G06Q 10/00 705/7.11 |
| 2013/0124257 | A1* | 5/2013 | Schubert | G06Q 30/02 705/7.29 |
| 2013/0268468 | A1* | 10/2013 | Vijayaraghavan | G06Q 30/0631 706/12 |
| 2014/0249872 | A1* | 9/2014 | Stephan | G06Q 10/063 705/7.11 |
| 2015/0189088 | A1* | 7/2015 | Surridge | H04M 3/5233 379/265.12 |
| 2015/0213484 | A1* | 7/2015 | Amara | H04L 67/535 707/E17.014 |
| 2015/0262107 | A1* | 9/2015 | Singh | G06Q 10/06393 705/7.39 |
| 2016/0132892 | A1* | 5/2016 | Zhou | G06Q 30/016 705/304 |
| 2016/0344868 | A1* | 11/2016 | Conway | H04M 3/42221 |
| 2016/0352900 | A1* | 12/2016 | Bell | H04M 3/5175 |
| 2017/0039233 | A1* | 2/2017 | Gauthier | G06Q 10/067 |
| 2017/0061343 | A1* | 3/2017 | Han | G06Q 10/067 |
| 2017/0124415 | A1* | 5/2017 | Choi | G06K 9/628 |
| 2019/0034963 | A1* | 1/2019 | George | G06N 5/04 |
| 2019/0164082 | A1* | 5/2019 | Wu | G06Q 50/01 |
| 2019/0325081 | A1* | 10/2019 | Liu | G06F 16/3344 |
| 2020/0126126 | A1* | 4/2020 | Briancon | G06N 5/003 |
| 2020/0371851 | A1* | 11/2020 | Liu | G06N 3/0454 |

OTHER PUBLICATIONS

SAP SE—Investor Relations, 2015 Annual Report—Reimagine Your Business, SAP SE, https://www.sap.com/docs/download/investors/2015/sap-2015-annual-report.pdf, 2016 (Year: 2016).*

Anil Bandhakavi, Domain-specific Lexicon Generation for Emotion Detection from Text, Robert Gordon University, PhD thesis, Jan. 2018 (Year: 2018).*

Maher Itani, Sentiment analysis and resources for informal Arabic text on social media, Sheffield Hallam University, http://shura.shu.ac.uk/23402/, Aug. 2018 (Year: 2018).*

Karakus, B., & Aydin, G. (May 2016). Call center performance evaluation using big data analytics. In 2016 International Symposium on Networks, Computers and Communications (ISNCC) (pp. 1-6). IEEE. (Year: 2016).*

U.S. Appl. No. 16/029,023, filed Jul. 6, 2018, Pony, Adi et al.

* cited by examiner

SYSTEM AND METHOD FOR CALCULATING A SCORE FOR A CHAIN OF INTERACTIONS IN A CALL CENTER

FIELD OF THE INVENTION

The present invention is in the field of customer experience analytics. In particular, the present invention is directed towards systems and methods for calculating a score for a chain of interactions in a call center.

BACKGROUND OF THE INVENTION

Currently, call center analytics systems and methods apply customer experience metrics to voice interactions in order to evaluate agents, rank business processes, and/or to find examples of particularly bad interactions. For example, one customer experience model, called CX Metric, is a model that is trained on interaction content (e.g., text) and uses customer surveys as labels. Interaction chains are series of interactions performed by the same customer, usually for the same or related reasons, during a relatively short period of time. Currently available analytics systems and methods evaluate each interaction comprising the chain independently. However, this method produces inaccurate results, as customer experience also depends on the previous interaction or interactions in the chain. Furthermore, the number of interaction chains in which every interaction has a follow-up survey (from the interactant) associated with it is typically very small, and accordingly does not provide enough data for training such models.

What are needed, therefore, are systems and methods which evaluate each interaction in a series or chain of interactions while taking into account the evolution of the customer experience over the chain.

SUMMARY OF EMBODIMENTS OF THE INVENTION

Various embodiments of the invention include systems and methods of calculating a score for a chain of interactions in a call center, performed on a computer having a processor, memory, and one or more code sets stored in the memory and executed by the processor, the systems and methods including: during a first training phase, training a first model which, given a processed text of a given interaction and metadata associated with the given interaction, predicts an initial estimated customer satisfaction score for the given interaction; during a second training phase, training a second model which, given a processed text of a given interaction and metadata associated with the given interaction, processed text and associated metadata of an immediately preceding interaction in a given chain of interactions, and one or more features of the chain of interactions, predicts a refined estimated customer satisfaction score for the given interaction; and during an inference phase: given a chain of interactions and associated metadata of each interaction, computing an initial estimated customer satisfaction score for each interaction in the chain of interactions using the first model; beginning with a second interaction in the given chain of interactions and associated metadata of each interaction, computing a refined estimated customer satisfaction score for each interaction in the chain of interactions using the second model; combining the refined estimated customer satisfaction score of each interaction into a combined customer satisfaction score for the given chain of interactions; and outputting the combined customer satisfaction score.

In some embodiments, the first training phase may include: collecting by the processor a plurality of interactions, in which each of the plurality of interactions comprises associated survey information; converting by the processor any non-text interactions of the plurality of interactions into text; preprocessing by the processor text of each of the plurality of interactions; extracting by the processor a plurality of metadata features from each of the plurality of interactions; and training by the processor the first model based on the text, metadata, and survey information of each of the plurality of interactions.

In some embodiments, the second training phase may include: for the same plurality of interactions, as well as an immediately preceding interaction of each of the plurality of interactions in a given chain of interactions: converting by the processor any non-text interactions into text; preprocessing by the processor text of each of the plurality of interactions and immediately preceding interactions; extracting by the processor a plurality of metadata features from each of the plurality of interactions and immediately preceding interactions; applying by the processor the first model to each of the plurality of interactions and immediately preceding interactions; generating by the processor an interim estimated customer satisfaction score for each of the plurality of interactions and immediately preceding interactions; and training by the processor the second model based on one or more features of the chain of interactions, and the interim estimated customer satisfaction score for each of the plurality of interactions and immediately preceding interactions.

In some embodiments, an interaction may include at least one of a voice recording, an e-mail, and a messaging chat. In some embodiments, the associated survey information may include a survey score provided by a customer who was a party to the given interaction. In some embodiments, preprocessing may include transforming by the processor at least one of one or more words and one or more phrases from the text of a given interaction into one or more word embedding vectors, using one or more pre-trained in-domain embeddings.

In some embodiments, one or more of the first model and the second model may include a Convolutional Neural Network architecture (CNN) and a Deep Neural Network architecture (DNN), and wherein the CNN and the DNN are load-balanced with an auxiliary output of the CNN. In some embodiments, one or more of the first model and the second model may include a Convolutional Neural Network architecture (CNN) for text processing followed by a regression model, and wherein the regression model outputs the estimated customer satisfaction score based on an output of the CNN and the metadata of the given interaction.

Further embodiments of the invention include systems and methods of calculating a score for a chain of interactions in a call center, performed on a computer having a processor, memory, and one or more code sets stored in the memory and executed by the processor, the systems and methods including: during a first training phase, training a first model which, given an interaction and associated interaction metadata, predicts an initial estimated customer satisfaction score for the given interaction; during a second training phase, training a second model which, given an interaction in a given chain of interactions, an immediately preceding interaction in the given chain of interactions, associated interaction metadata of the interaction and the immediately preceding interaction, and one or more features of the given chain of interactions, predicts a refined estimated customer satisfaction score for the given interaction; and during an inference phase: given a chain of interactions and associated metadata of each interaction, computing an initial estimated customer satisfaction score for each interaction in the chain of interactions using the first model; beginning with a second interaction in the given chain of interactions and associated metadata of each interaction, computing a refined estimated customer satisfaction score for each interaction in the chain of interactions using the second model; combining the refined estimated customer satisfaction score of each interaction into a combined customer satisfaction score for the given chain of interactions; and outputting the combined customer satisfaction score.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
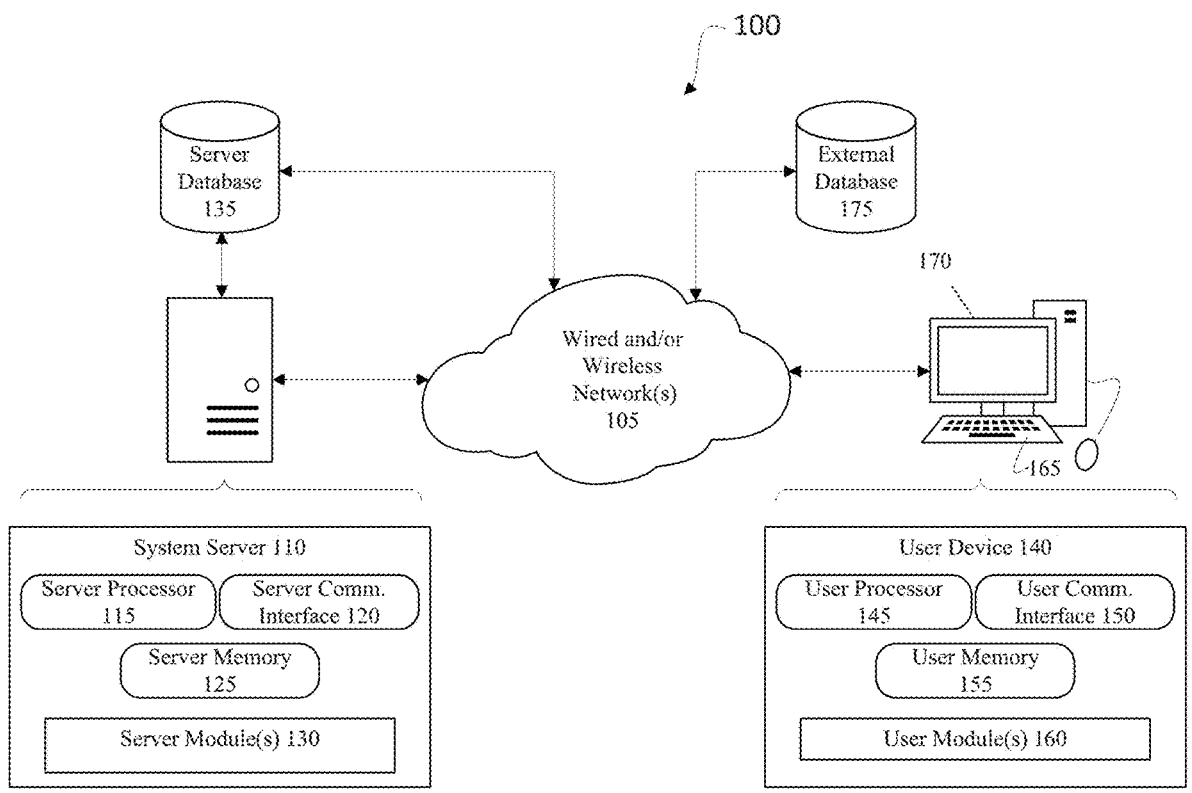
FIG. 1 shows a high-level diagram illustrating an exemplary configuration of a system 100 for performing one or more aspects of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention may provide systems and methods which may compute a customer experience score for a chain of interactions (e.g., calls, chats, and/or emails, etc.). Embodiments of the invention may implement one or more algorithms which, in a first training phase, may use customer feedback such as, e.g., survey data and/or information, to train a deep learning based model that predicts a customer experience metric relating to an interaction in a chain of interactions. Then, in a second training phase, one or more algorithms may be implemented to enhance or refine the model by adding or otherwise combining it with a predicted customer experience metric of the previous interaction in the chain of interactions. Finally, in an inference phase, one or more algorithms may be implemented to generate or otherwise calculate a single customer satisfaction score for a given chain of interactions, e.g., based on the first and second models.

In some embodiments, the first model training phase may relate initially to a single interaction in an interaction chain. Embodiments of the invention may perform one or more of the following steps: (1) collect interactions for which customer (e.g., interactant) survey information is available; (2) transcribe the calls using, e.g., available automatic speech recognition (ASR) software or other speech-to-text (STT) software; (3) preprocess the text (e.g., remove function words, etc.); (4) for each interaction, extract one or more metadata features, for example: duration (sec), non-speech percentage, weekend (0/1), day in week, hour, number of times the customer was placed on hold, number of times the customer was transferred, number of times the customer was conferenced, hold duration percentage, time of day (e.g., morning, afternoon, evening, night, etc.), finance type, credit class code, etc.; and (5) apply a deep learning algorithm, e.g., a Convolutional Neural Network (CNN), with a unique architecture to support both structured and unstructured features to learn a customer satisfaction score from an interaction's text, metadata and survey results, in order to predict an initial estimated customer satisfaction score for a given interaction.

In some embodiments, the second model training phase may relate to a single interaction in an interaction chain. Embodiments of the invention may perform one or more of the following steps: (1) select or otherwise identify interaction chains; (2) for each interaction in the chain, predict an initial customer experience score using the model trained in the previous phase; (3) in addition to features used in the first model training phase, for each interaction add features from the previous interaction in the chain as follows: (4) add the estimated customer experience score of the previous interaction; (5) add metadata of the previous interaction; (6) for each interaction, add chain features, such as, for example, place in chain order, elapsed hours from the previous interaction, etc.; and (7) re-train the model using, for example, a CNN or similar algorithm, in order to predict a refined estimated customer satisfaction score for a given interaction.

During an inference phase, embodiments of the invention may perform one or more of the following steps: (1) given a chain of interactions, apply ASR to every interaction in the chain; (2) use the first phase model to estimate a customer experience score for every interaction in the chain; (3) use the second phase model to refine the customer experience score starting from the second interaction in the chain; (4) and combine all scores to a single score per chain as follows:

$$CXscore(\text{chain}) = \frac{1-r}{1-r^n} \sum_{i=1}^{n} (CXscore(i) * r^{i-1})$$

where n is the number of interactions in the chain and r is a weight power factor.

These and other features of embodiments of the invention will be further understood with reference to FIGS. 1-8 as described herein.

FIG. 1 shows a high-level diagram illustrating an exemplary configuration of a system 100 for performing one or more aspects of the invention described herein, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is, therefore, intended to represent various forms of digital computers, such as laptops, desktops, workstations, personal digital assistants, servers, blade servers, mainframes, and other appropriate computers and/or networked or cloud-based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or several processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such as a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In accordance with embodiments of FIG. 1, the exemplary software modules may include a communication module and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are, therefore, intended to be representative of the various functionalities of system server 110 in accordance with some embodiments of the invention. It should be noted that, in accordance with various embodiments of the invention, server modules 130 may be executed entirely on system server 110 as a stand-alone software package, partly on system server 110 and partly on user device 140, or entirely on user device 140.

Server memory 125 may be, for example, random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
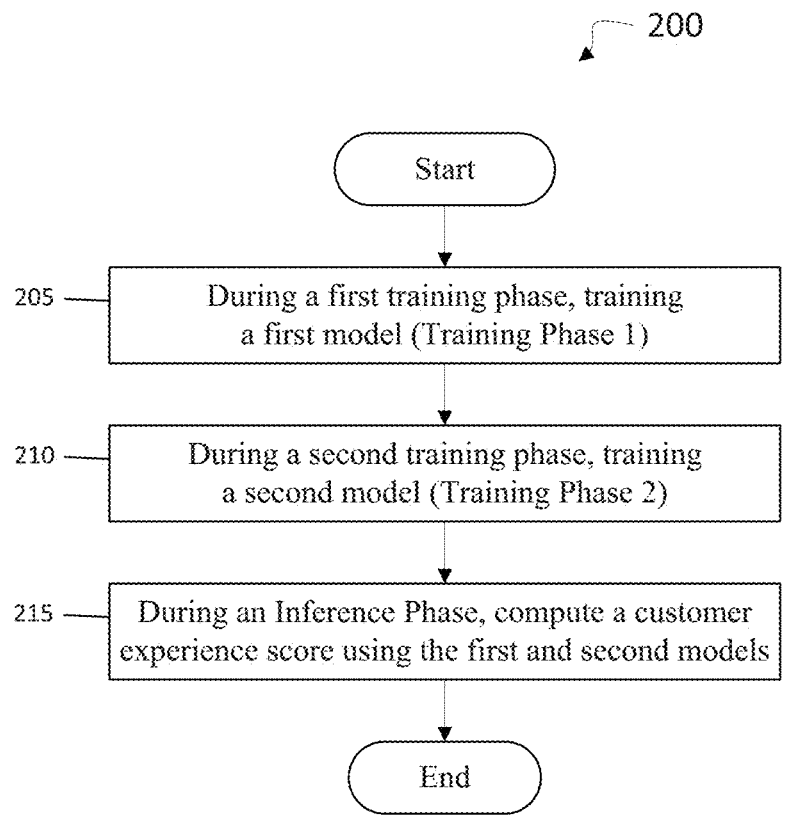
FIG. 2 is a high-level diagram illustrating an example configuration of a method workflow for calculating a score for a chain of interactions in a call center according to at least one embodiment of the invention.

FIG. 2 is a high-level diagram illustrating an example configuration of a method workflow 200 for calculating a score for a chain of interactions in a call center according to at least one embodiment of the invention. As described herein, embodiments of systems and methods of the invention enable computation of a customer experience score for a chain of interactions (e.g., calls, chats, emails, etc.), focusing on a chain of interactions and using interaction content and explicit feedback from the customer. Embodiments of the invention include at least three main phases, as shown in FIG. 2: a first training phase (also referred to herein as "Training Phase 1"), a second training phase (also referred to herein as "Training Phase 2"), and an Inference phase. Furthermore, as described herein, in some embodiments, one or more of these phases may be implemented iteratively. For example, Training Phase 1 and Training Phase 2 may be implemented iteratively, e.g., to further refine the various training models described herein, and/or may receive feedback from the Inference Phase to further inform one or more of the models.

In some embodiments, method workflow 200 may be performed on a computer (e.g., system server 110) having a processor (e.g., server processor 115), memory (e.g., server memory 125), and one or more code sets or software (e.g., server module(s) 130) stored in the memory and executing in or executed by the processor. Method workflow 200 begins with the first of the three processes, at step 205, when, during a first training phase, the processor is configured to train a first model, as described in detail with reference to FIG. 3.

Figure 3:
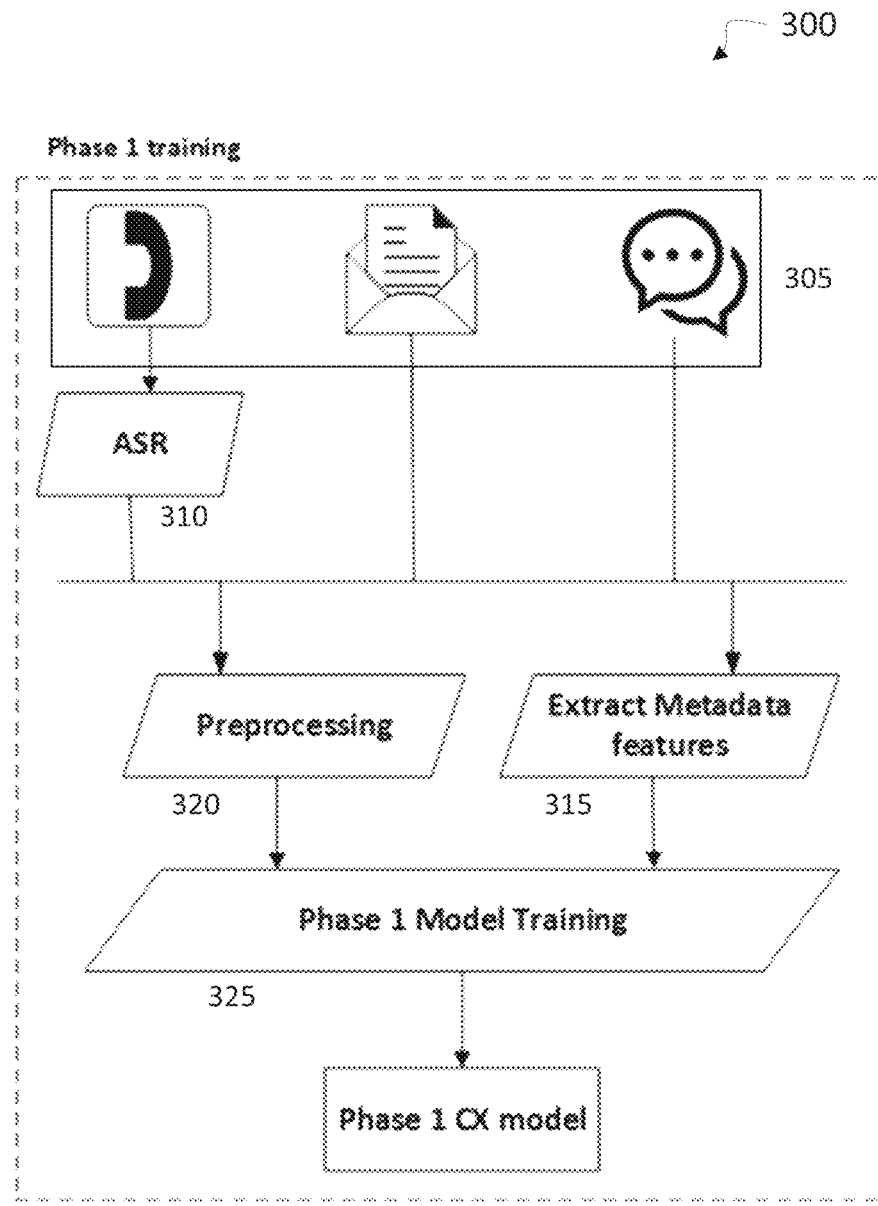
FIG. 3 shows a method of training a first model according to at least one embodiment of the invention.

Turning to FIG. 3, a method 300 of training a first model is described according to at least one embodiment of the invention. At step 305, in some embodiments, the processor may collect a plurality of interactions in which each of the plurality of interactions includes associated survey information. In some embodiments, an interaction may be a voice recording, an e-mail, a messaging chat, a text message, etc. In some embodiments, the processor may receive as an input to the algorithm a dataset of e-mails, a dataset of chats, and/or a dataset of voice interactions/conversations (e.g., previously converted to text). At step 210, in some embodiments, for example when voice or any other non-text interactions have not been previously converted to text), the processor may convert any non-text interactions (e.g., voice conversations) of the plurality of interactions into text, using, for example, ASR software. In some embodiments, the processor may further receive as an input automatically transcribed content (ASR) of a dataset of voice conversations.

In some embodiments, all input interactions may have a survey score available in a database. For example, a customer may have been contacted to provide survey information after an interaction or requested to provide survey information at the conclusion of an interaction (e.g., asking to rate an interaction on a scale from 1 to 5, etc.). Such survey data may be stored in a database and accessed by the processor when needed, as described herein.

In some embodiments, at step 315, the processor may receive as input metadata features describing each of the voice conversations and/or other interactions in a dataset. In some embodiments, the processor may extract the metadata from the voice conversations and/or other interactions. A non-exhaustive list of metadata features may include (but are not limited to) the following provided in Table 1 below:

TABLE 1

| Feature group | Feature name | Description |
| --- | --- | --- |
| Interaction features | Duration (sec) | Call duration |
| | Non speech percentage (voice) | Silence as a portion of a call |
| | Weekend (0/1) | Was the call made on weekend? |
| | Day in week | What day in a week was the call made [1-7] |
| | Hour | What hour? |
| | #Holds (voice) | Number of holds in a call |
| | #Transfers (voice) | Number of transfers in a call |
| | #Conference (voice) | Number of conferences in a call |
| | Hold duration percentage (voice) | Hold time as a portion of a call |
| | Morning, afternoon, evening, night | Was the call made in the morning, afternoon ... |
| Customer features | Finance type | Customer's finance type |
| | Credit class code | Customer's credit class |
| Agent features | Skill group | Agent's skill group |
| | Call amount | Number of calls made by the agent in a period of time |
| | Agent group | |
| Survey | CSAT score | A score between 0 and 10 given by the customer after the interaction |

In some embodiments, at step 320, the processor may be configured to preprocess the text of each of the plurality of interactions. For example, in some embodiments, the processor may take an input (e.g., as a string) the text of a given interaction and use pre-trained in-domain embeddings to transform words and phrases from the input text into one or more vectors. In some embodiments, the processor may train one or more word embeddings using existing tools such as: word2vec, GloVe, fastText, GenSim and others. Word embedding, as understood herein, is the collective name for a set of language modeling and feature learning techniques in natural language processing (NLP) in which words or phrases from a given vocabulary are mapped to vectors of real numbers. Conceptually this involves a mathematical embedding from a space with one dimension per word to a continuous vector space with a much lower dimension. In some embodiments, one or more of these NLP techniques may be implemented in order to create the word embeddings, which may be implemented in later steps of method 300, as described herein. In some embodiments, the output may be word embeddings of the type Vector<float>.

In some embodiments, at step 325, the processor may be configured to train a first model which, given a processed text of a given interaction and metadata associated with the given interaction, predicts an initial estimated customer satisfaction score for the given interaction. In some embodiments, the processor may train a regressor that given a processed text of the interaction and its meta-data predicts a customer satisfaction (customer experience) score. Those of skill in the art will understand that a variety of machine learning based regression models may be used according to embodiments of the invention. Two such examples are provided herein.

Figure 4:
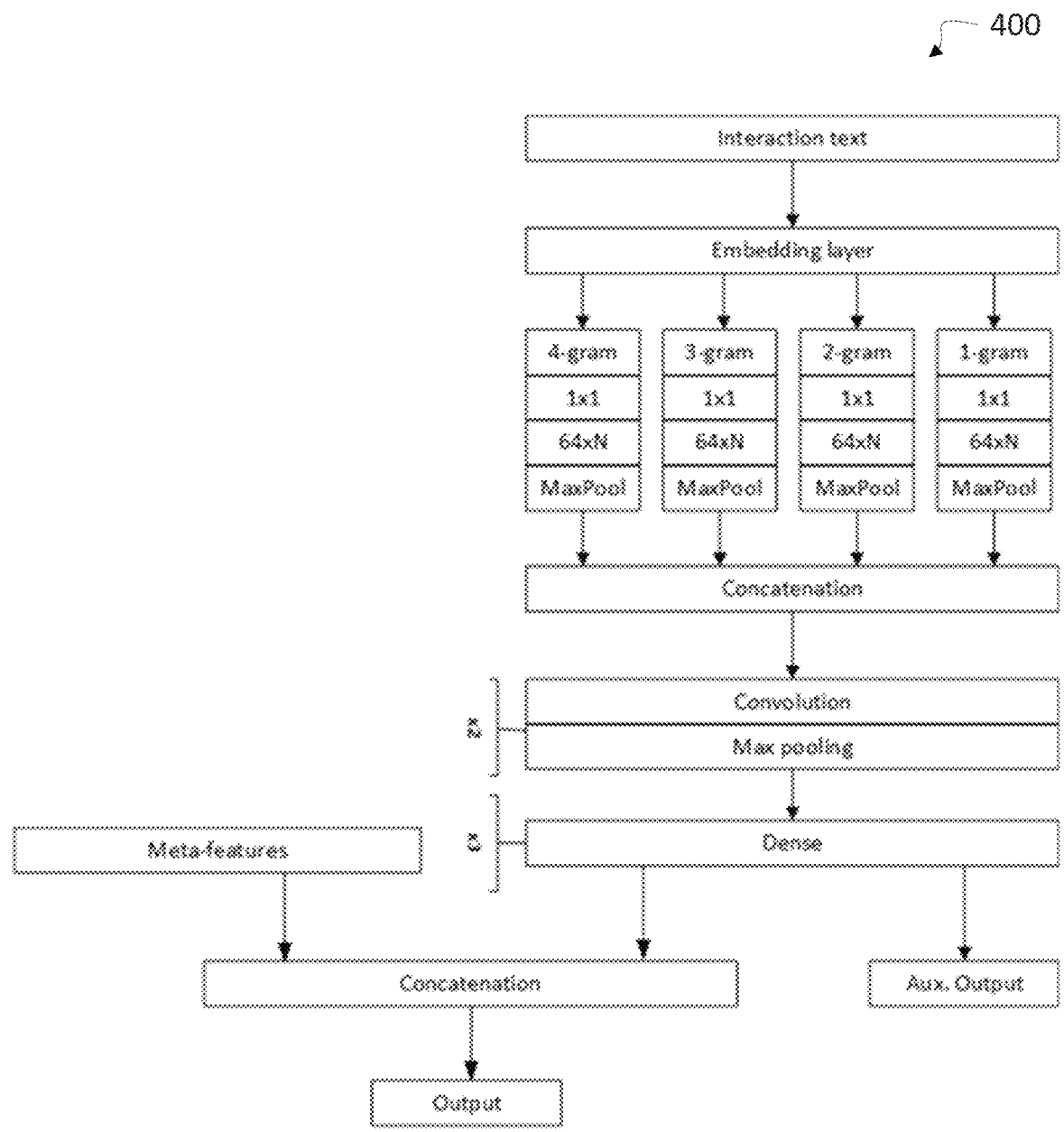
FIG. 4 shows an example regression model according to at least one embodiment of the invention.

Convolutional Neural Network (CNN) with an auxiliary output:

Turning briefly to FIG. 4, regression model 400 depicted includes a fairly standard CNN architecture for addressing the text features as well as a more simple Deep Neural Network (DNN) for the meta-features. In some embodiments, the predictions of both networks may be concatenated and fed to a linear regression output function. An auxiliary output may be used to load-balance the learning process between the two networks.

Figure 5:
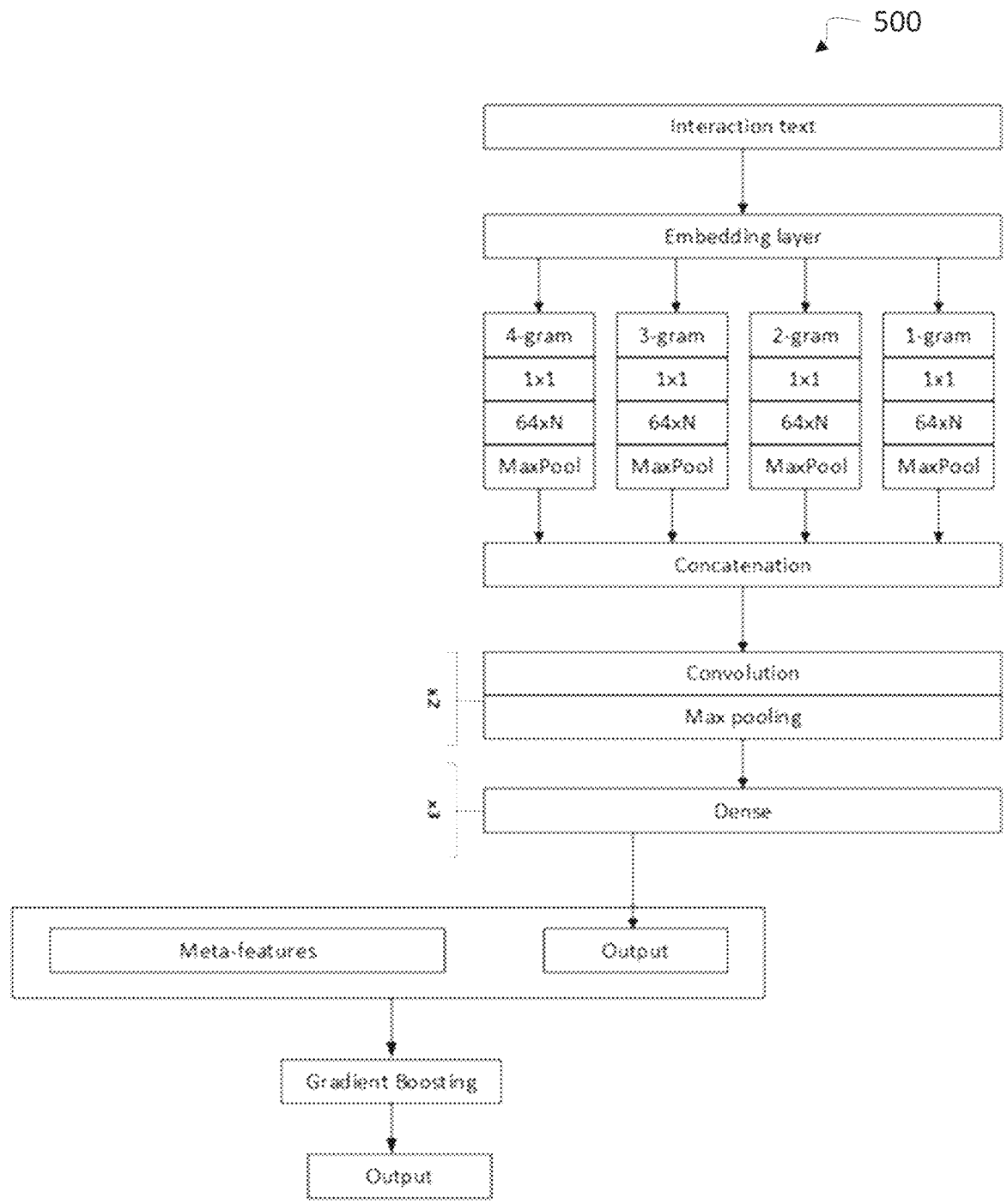
FIG. 5 shows an example regression model according to at least one embodiment of the invention.

Convolutional Neural Network followed by a classic regression model:

Turning briefly to FIG. 5, regression model 500 shows a tandem of a CNN model for the text features followed by a classic regression model. Examples of classic regression models which may be implemented include SVM, Random Forest, XGBoost and Gradient Boosting.

Returning to FIG. 3, in some embodiments, at step 325, the processor may be configured to train the first model based on the text, metadata, and survey information of each of the plurality of interactions. The output of this phase is a regression model that predicts the customer experience score based on the content of the interaction and its metadata features.

Returning to FIG. 2, Method workflow 200 continues with the second of the three processes, at step 210, when, during a second training phase, the processor is configured to train a second model, as described in detail with reference to FIG. 6.

Figure 6:
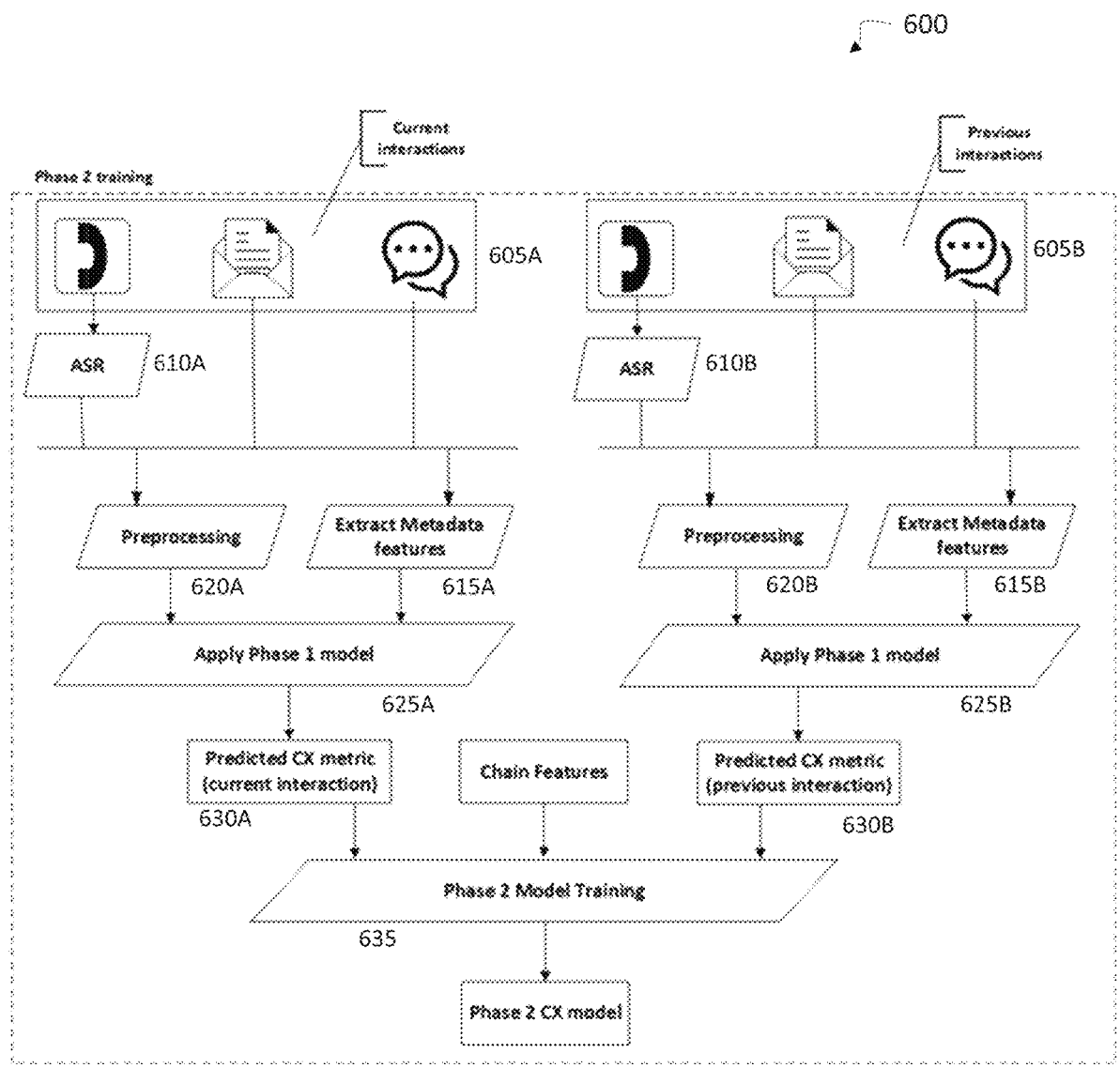
FIG. 6 shows a method of training a second model according to at least one embodiment of the invention.

Turning to FIG. 6, a method 600 of training a second model is described according to at least one embodiment of the invention. At step 605A in some embodiments, the processor may collect or otherwise identify the plurality of interactions used in the first phase (detailed in FIG. 3). Likewise, at step 605B, for each interaction used in the first phase, the processor may be configured to collect or otherwise identify the previous interaction made by the same customer. In some embodiments, a previous interaction may be from a different channel as the current interaction. For example, the current interaction may be a phone call, while the previous interaction may be a chat. In some embodiments, in case there is no previous interaction, predefined default values may be used for the predicted customer experience score and the chain features that would have been provided in connection with a previous interaction.

In some embodiments, an interaction may be a voice recording, an e-mail, a messaging chat, a text message, etc. In some embodiments, the processor may receive as an input to the algorithm a dataset of e-mails, a dataset of chats, and/or a dataset of voice interactions/conversations (e.g., previously converted to text). At steps 610A and 610B respectively, in some embodiments (for example, when voice or any other non-text interactions have not been previously converted to text), the processor may convert any non-text interactions (e.g., voice conversations) of the plurality of interactions and prior interactions into text, using, for example, ASR software. In some embodiments, the processor may further receive as an input automatically transcribed content (ASR) of a dataset of voice conversations.

As discussed with reference to FIG. 3, in some embodiments, all input interactions may have a survey score available in a database. For example, a customer may have been contacted to provide survey information after an interaction or requested to provide survey information at the conclusion of an interaction (e.g., asking to rate an interaction on a scale from 1 to 5, etc.). Such survey data may be stored in a database and accessed by the processor when needed, as described herein. In some embodiments, previous interactions may not necessarily have or require survey data.

In some embodiments, at steps 615A and 615B respectively, the processor may receive as input metadata features describing each of the voice conversations and/or other interactions in a dataset. In some embodiments, the processor may extract the metadata from the voice conversations and/or other interactions. A non-exhaustive list of metadata features may include (but are not limited to) the items provided in Table 1 above.

In some embodiments, at steps 620A and 620B respectively, the processor may be configured to preprocess the text of each of the plurality of interactions and previous interactions.

For example, as described with regard to step 320 of FIG. 3, in some embodiments, the processor may take an input (e.g., as a string) the text of a given interaction and use pre-trained in-domain embeddings to transform words and phrases from the input text into one or more vectors. In some embodiments, the processor may train one or more word embeddings using existing tools such as: word2vec, GloVe, fastText, GenSim and others. In some embodiments, one or more of these NLP techniques may be implemented in order to create the word embeddings, which may be implemented in later steps of method 600, as described herein. In some embodiments, the output may be word embeddings of the type Vector<float>.

In some embodiments, at steps 625A and 625B respectively, the processor may be configured to apply the first model (described in detail with regard to FIG. 3), which, given a processed text of a given interaction and metadata associated with the given interaction, predicts an initial estimated customer satisfaction score for the given interaction. In some embodiments, at steps 630A and 630B respectively, the processor may be configured to generate an interim estimated customer satisfaction score for each of the plurality of interactions and immediately preceding interactions.

In some embodiments, at step 635, the processor may be configured to train a second model based on one or more features of the chain of interactions, and the interim estimated customer satisfaction score for each of the plurality of interactions and immediately preceding interactions. In some embodiments, the second model may receive as an input the predicted customer experience score (interim estimated customer satisfaction score) of the current interaction (e.g., a real number between 0 and 10) and the predicted customer experience score (interim estimated customer satisfaction score) of the previous interaction (e.g., a real number between 0 and 10). In some embodiments, if a previous interaction is not available, an average survey score may be substituted in the training dataset.

In some embodiments, a non-exhaustive list of chain features may include (but are not limited to) the following provided in Table 2 below:

TABLE 2

| Feature name | Description | Default |
| --- | --- | --- |
| Place in chain | First call, second, ... | 1 |
| Elapsed hours | Hours between current and the previous call | 4320 (half a year) |
| Previous channel | The channel of the previous interaction | Not available |

In some embodiments, a machine learning based regression algorithm may be implemented, such as SVM, random forest, XGBoost and gradient boosting. The output is a second training model which, given a processed text of a given interaction and metadata associated with the given interaction, processed text and associated metadata of an immediately preceding interaction in a given chain of interactions, and one or more features of the chain of interactions, predicts a refined estimated customer satisfaction score for the given interaction.

Returning to FIG. 2, Method workflow 200 continues with the third of the three processes, at step 215, when, during an inference phase, the processor is configured, to generate or otherwise calculate a single customer satisfaction score for a given chain of interactions, e.g., based on the first and second models, as described in detail with reference to FIG. 7.

Figure 7:
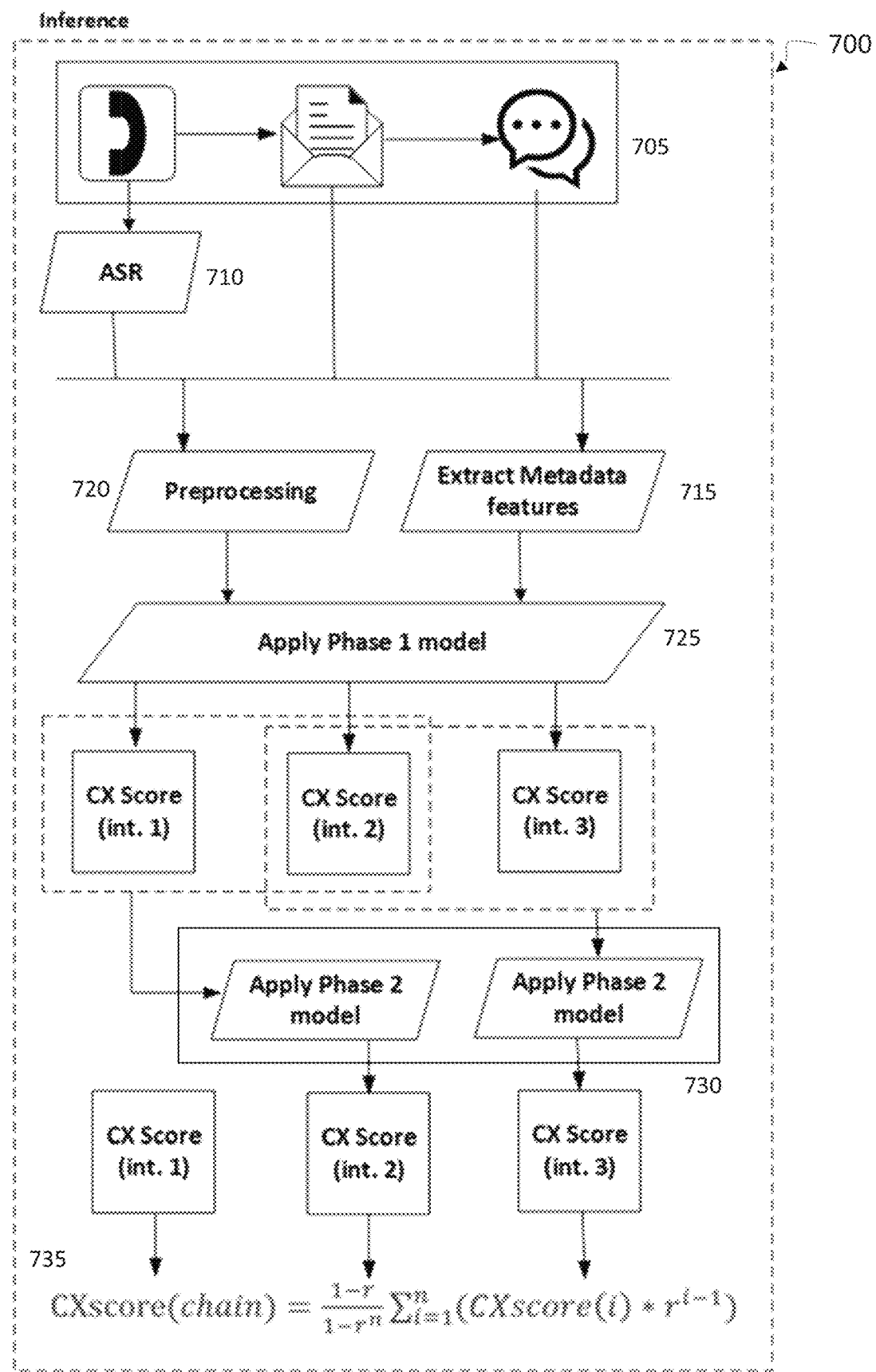
FIG. 7 shows a method of determining a customer experience score for a chain of interactions according to at least one embodiment of the invention.

Turning to FIG. 7, a method 700 of determining a customer experience (customer satisfaction) score for a chain of interactions is described according to at least one embodiment of the invention. At step 705, in some embodiments, the processor may input a chain of interactions (detailed in FIG. 3). In some embodiments, at step 710, in the event one of the interactions in the chain of interactions is a non-text interaction (e.g., a voice interaction such as a phone call), the processor may be configured to automatically transcribe or otherwise convert the non-text interaction to text (e.g., using ASR). At step 715, in some embodiments, the processor may be configured to extract the metadata from the voice conversations and/or other interactions of the chain of interactions. A non-exhaustive list of metadata features may include (but are not limited to) the items provided in Table 1 above. It should be noted that, in some embodiments, no survey information is required for the received chain of interactions (interaction chain).

In some embodiments, at step 720, the processor may be configured to preprocess the text of each of the plurality of interactions in the chain of interactions, for example, as described with regard to step 320 of FIG. 3.

In some embodiments, at step 725, the processor may be configured to apply the first model to each interaction in the interaction chain and compute an initial estimated customer satisfaction score (customer experience score) for each interaction in the chain of interactions, using the first model. Next, at step 730, in some embodiments, beginning with the second interaction in the chain of interactions and associated metadata of each interaction, computing a refined estimated customer satisfaction score for each interaction in the chain of interactions, using the second model. That is, starting with the second interaction, the processor may be configured to apply the phase 2 model on model 1 prediction of the customer experience score of the current and the previous interactions, incorporating the additional chain data, as described herein, to compute a refined estimated customer satisfaction score for each interaction in the interaction chain.

Finally, in some embodiments, at step 735, the processor may be configured to merge or otherwise combine the refined estimated customer satisfaction score of each interaction into a combined customer satisfaction score for the given chain of interactions, and output the combined customer satisfaction score, e.g., to a display screen. In some embodiments, the processor may combine customer experience (CX) scores of each interaction, to determine one score per chain as follows:

$$CXscore(\text{chain}) = \frac{1-r}{1-r^n} \sum_{i=1}^{n} (CXscore(i) * r^{i-1})$$

where n is the number of the interaction in the chain and r is a predetermined weight power factor.

Figure 8:
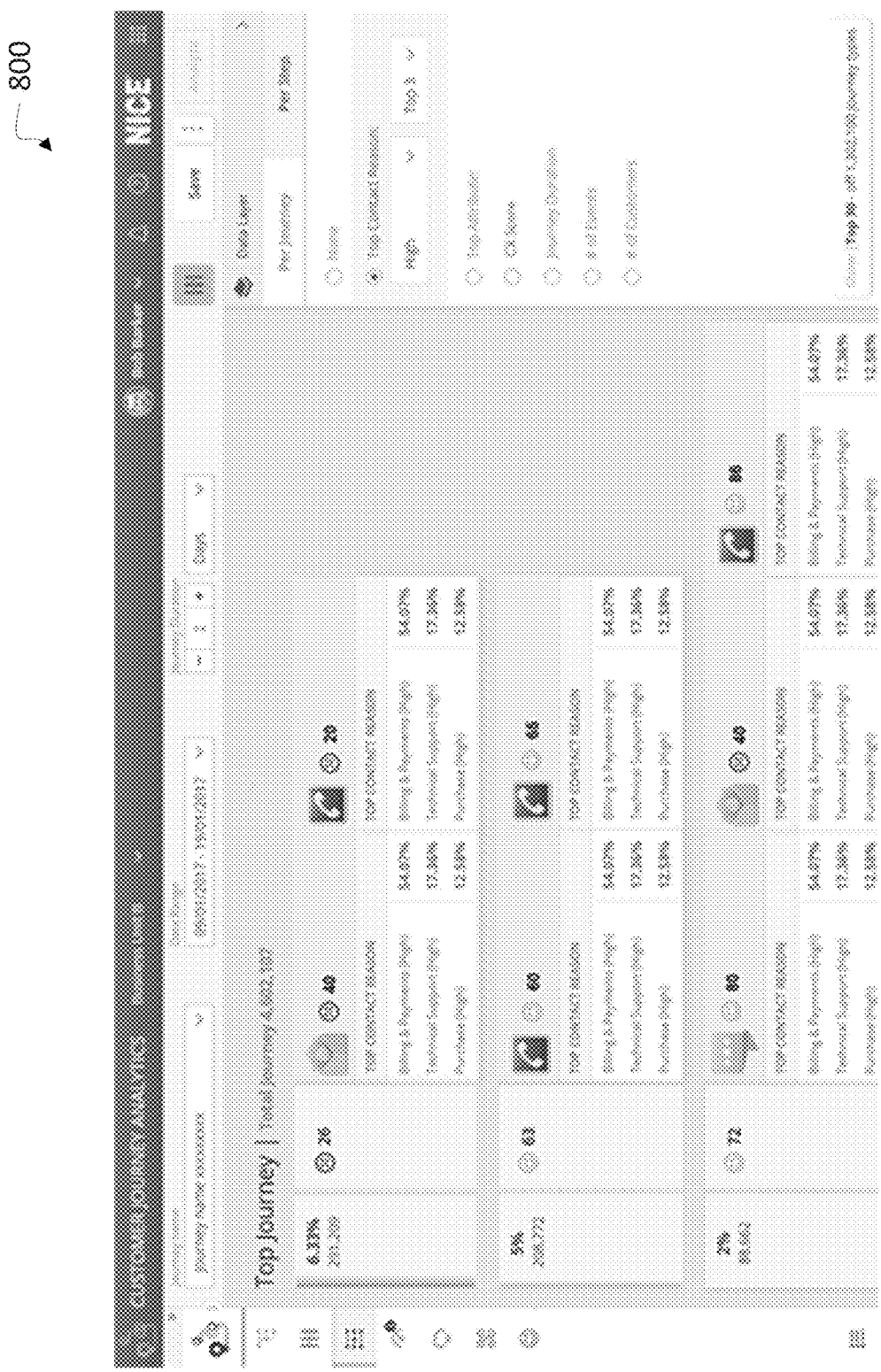
FIG. 8 shows an example screenshot of a user interface (UI) of an application on which embodiments of the invention have been implemented.

For example, suppose a chain has three (3) interactions: two consecutive phone calls followed by an e-mail. After applying phase 1 and phase 2 models, the CX scores are: 7, 4 and 2. Assuming r=2, then CXscore=(1/7)*7+(2/7)*4+(4/7)*2=23/7=3.3. Alternatively, in other embodiments other formulae that combine the weights of individual interactions may also be implemented to determine the customer interaction score for the chain of interactions. FIG. 8 shows an example screenshot 800 of a user interface (UI) of an application on which embodiments of the invention have been implemented. As can be seen in screenshot 800, both scores of individual interactions and of the interaction chain are displayed.

Embodiments of the invention provide significant improvements over currently available systems and methods. For example, embodiments of the invention enable users to identify patterns that lead to bad interaction chains, drill down to the reason for bad interaction chains, rank business processes based on the customer experience score of the interaction chains, etc.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of calculating a score for a chain of interactions in a call center, performed on a computer having a processor, memory, and one or more code sets stored in the memory and executed by the processor, the method comprising:
   during a first training phase, training a first model, wherein training the first model uses:
   text of a given interaction processed into vectors, survey information, and metadata associated with the given interaction,
   the training such that the first model predicts an initial estimated customer satisfaction score for the given interaction;
   during a second training phase, training a second model, wherein training the second model uses:
   text of a given interaction and metadata associated with the given interaction, processed text and associated metadata of an immediately preceding interaction in a given chain of interactions, and one or more features of the chain of interactions, and
   the initial estimated customer satisfaction score for the immediately preceding interaction, the score produced by the first model,
   the training such that the second model predicts a refined estimated customer satisfaction score for the given interaction; and
   during an inference phase:
   given a chain of interactions and associated metadata of each interaction, computing
   the initial estimated customer satisfaction score for each interaction in the chain of interactions using the first model;
   beginning with a second interaction in the given chain of interactions and associated metadata of each interaction, computing a refined estimated customer satisfaction score for each interaction in the chain of interactions using the second model;
   combining the refined estimated customer satisfaction score of each interaction into a combined customer satisfaction score for the given chain of interactions; and
   outputting the combined customer satisfaction score.

2. The method as in claim 1, wherein the first training phase comprises:
   collecting by the processor a plurality of interactions, wherein each of the plurality of interactions comprises associated survey information;
   converting by the processor any non-text interactions of the plurality of interactions into text;
   preprocessing by the processor text of each of the plurality of interactions;
   extracting by the processor a plurality of metadata features from each of the plurality of interactions; and
   training by the processor the first model based on the text, metadata, and survey information of each of the plurality of interactions.

3. The method as in claim 2, wherein the second training phase comprises:
   for the same plurality of interactions, as well as an immediately preceding interaction of each of the plurality of interactions in a given chain of interactions:
   converting by the processor any non-text interactions into text;
   preprocessing by the processor text of each of the plurality of interactions and immediately preceding interactions;
   extracting by the processor a plurality of metadata features from each of the plurality of interactions and immediately preceding interactions;
   applying by the processor the first model to each of the plurality of interactions and immediately preceding interactions;
   generating by the processor an interim estimated customer satisfaction score for each of the plurality of interactions and immediately preceding interactions; and
   training by the processor the second model based on one or more features of the chain of interactions, and the interim estimated customer satisfaction score for each of the plurality of interactions and immediately preceding interactions.

4. The method as in claim 1, wherein an interaction comprises at least one of a voice recording, an e-mail, and a messaging chat.

5. The method as in claim 1, wherein the associated survey information comprises a survey score provided by a customer who was a party to the given interaction.

6. The method as in claim 1, wherein preprocessing comprises transforming by the processor at least one of one or more words and one or more phrases from the text of a given interaction into one or more word embedding vectors, using one or more pre-trained in-domain embeddings.

7. The method as in claim 1, wherein one or more of the first model and the second model comprises a Convolutional Neural Network architecture (CNN) and a Deep Neural Network architecture (DNN), and wherein the CNN and the DNN are load-balanced with an auxiliary output of the CNN.

8. The method as in claim 1, wherein one or more of the first model and the second model comprises a Convolutional Neural Network architecture (CNN) for text processing followed by a regression model, and wherein the regression model outputs the estimated customer satisfaction score based on an output of the CNN and the metadata of the given interaction.

9. A system of calculating a score for a chain of interactions in a call center, comprising:
 a computer having a processor and memory, and
 one or more code sets stored in the memory and executed by the processor, which configure the processor to:
  during a first training phase, train a first model, wherein training the first model uses:
   text of a given interaction processed into vectors, survey information, and metadata associated with the given interaction,
   the training such that the first model predicts an initial estimated customer satisfaction score for the given interaction;
  during a second training phase, train a second model, wherein training the second model uses:
   text of a given interaction and metadata associated with the given interaction, processed text and associated metadata of an immediately preceding interaction in a given chain of interactions, and one or more features of the chain of interactions, and
   the initial estimated customer satisfaction score for the immediately preceding interaction, the score produced by the first model,
   the training such that the second model predicts a refined estimated customer satisfaction score for the given interaction; and
  during an inference phase:
   given a chain of interactions and associated metadata of each interaction, compute an initial estimated customer satisfaction score for each interaction in the chain of interactions using the first model;
   beginning with a second interaction in the given chain of interactions and associated metadata of each interaction, compute a refined estimated customer satisfaction score for each interaction in the chain of interactions using the second model;
   combine the refined estimated customer satisfaction score of each interaction into a combined customer satisfaction score for the given chain of interactions; and
   output the combined customer satisfaction score.

10. The system as in claim 9, wherein, during the first training phase, the processor is configured to:
 collect a plurality of interactions, wherein each of the plurality of interactions comprises associated survey information;
 convert any non-text interactions of the plurality of interactions into text;
 preprocess text of each of the plurality of interactions;
 extract a plurality of metadata features from each of the plurality of interactions; and
 train the first model based on the text, metadata, and survey information of each of the plurality of interactions.

11. The system as in claim 10, wherein, during the second training phase, the processor is configured to:
 for the same plurality of interactions, as well as an immediately preceding interaction of each of the plurality of interactions in a given chain of interactions:
 convert any non-text interactions into text;
 preprocess text of each of the plurality of interactions and immediately preceding interactions;
 extract a plurality of metadata features from each of the plurality of interactions and immediately preceding interactions;
 apply the first model to each of the plurality of interactions and immediately preceding interactions;
 generate an interim estimated customer satisfaction score for each of the plurality of interactions and immediately preceding interactions; and
 train the second model based on one or more features of the chain of interactions, and the interim estimated customer satisfaction score for each of the plurality of interactions and immediately preceding interactions.

12. The system as in claim 9, wherein an interaction comprises at least one of a voice recording, an e-mail, and a messaging chat.

13. The system as in claim 9, wherein the associated survey information comprises a survey score provided by a customer who was a party to the given interaction.

14. The system as in claim 9, wherein preprocessing comprises transforming by the processor at least one of one or more words and one or more phrases from the text of a given interaction into one or more word embedding vectors, using one or more pre-trained in-domain embeddings.

15. The system as in claim 9, wherein one or more of the first model and the second model comprises a Convolutional Neural Network architecture (CNN) and a Deep Neural Network architecture (DNN), and wherein the CNN and the DNN are load-balanced with an auxiliary output of the CNN.

16. The system as in claim 9, wherein one or more of the first model and the second model comprises a Convolutional Neural Network architecture (CNN) for text processing followed by a regression model, and wherein the regression model outputs the estimated customer satisfaction score based on an output of the CNN and the metadata of the given interaction.

17. A method of calculating a score for a chain of interactions in a call center, performed on a computer having a processor, memory, and one or more code sets stored in the memory and executed by the processor, the method comprising:
 during a first training phase, training a first model, wherein training the first model uses:
  text of a given interaction processed into vectors, survey information, and associated interaction metadata,
  the training such that the first model predicts an initial estimated customer satisfaction score for the given interaction;
 during a second training phase, training a second model, wherein training the second model uses:
  text of a given interaction in a given chain of interactions of an immediately preceding interaction in the given chain of interactions,
  associated interaction metadata of the interaction and the immediately preceding interaction, and one or more features of the given chain of interactions, and
  the initial estimated customer satisfaction score for the immediately preceding interaction, the score produced by the first model, the training such that the second model predicts a refined estimated customer satisfaction score for the given interaction; and during an inference phase:
- given a chain of interactions and associated metadata of each interaction, computing an initial estimated customer satisfaction score for each interaction in the chain of interactions using the first model;
- beginning with a second interaction in the given chain of interactions and associated metadata of each interaction, computing a refined estimated customer satisfaction score for each interaction in the chain of interactions using the second model;
- combining the refined estimated customer satisfaction score of each interaction into a combined customer satisfaction score for the given chain of interactions; and
- outputting the combined customer satisfaction score.

18. The method as in claim 17, wherein the first training phase comprises:
- collecting by the processor a plurality of interactions, wherein each of the plurality of interactions comprises associated survey information;
- converting by the processor any non-text interactions of the plurality of interactions into text;
- preprocessing by the processor text of each of the plurality of interactions;
- extracting by the processor a plurality of metadata features from each of the plurality of interactions; and
- training by the processor the first model based on the text, metadata, and survey information of each of the plurality of interactions.

19. The method as in claim 18, wherein the second training phase comprises:
- for the same plurality of interactions, as well as an immediately preceding interaction of each of the plurality of interactions in a given chain of interactions:
- converting by the processor any non-text interactions into text;
- preprocessing by the processor text of each of the plurality of interactions and immediately preceding interactions;
- extracting by the processor a plurality of metadata features from each of the plurality of interactions and immediately preceding interactions;
- applying by the processor the first model to each of the plurality of interactions and immediately preceding interactions;
- generating by the processor an interim estimated customer satisfaction score for each of the plurality of interactions and immediately preceding interactions; and
- training by the processor the second model based on one or more features of the chain of interactions, and the interim estimated customer satisfaction score for each of the plurality of interactions and immediately preceding interactions.

20. The method as in claim 17, wherein an interaction comprises at least one of a voice recording, an e-mail, and a messaging chat.

* * * * *